(12) United States Patent
Bustelo et al.

(10) Patent No.: US 10,713,266 B2
(45) Date of Patent: *Jul. 14, 2020

(54) PROCESSING A QUERY VIA A LAMBDA APPLICATION

(71) Applicant: INTERNATIONAL BUSINESS MACHINES CORPORATION, Armonk, NY (US)

(72) Inventors: Leugim A. Bustelo, Austin, TX (US); Drew A. Logsdon, Austin, TX (US); Christopher J. Marcocci, Austin, TX (US); Corey A. Stubbs, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 163 days.

This patent is subject to a terminal disclaimer.

(21) Appl. No.: 15/825,538

(22) Filed: Nov. 29, 2017

(65) Prior Publication Data
US 2018/0113917 A1    Apr. 26, 2018

Related U.S. Application Data

(63) Continuation of application No. 15/333,024, filed on Oct. 24, 2016, now Pat. No. 9,864,785.

(51) Int. Cl.
*G06F 16/00*    (2019.01)
*G06F 16/2458*    (2019.01)
(Continued)

(52) U.S. Cl.
CPC ........ *G06F 16/2477* (2019.01); *G06F 16/248* (2019.01); *G06F 16/2453* (2019.01); *G06F 16/24568* (2019.01)

(58) Field of Classification Search
CPC .......... G06F 16/2477; G06F 16/24568; G06F 16/2453; G06F 16/248
(Continued)

(56) References Cited

U.S. PATENT DOCUMENTS 7,010,364 B1    3/2006  Singh et al.
7,672,928 B2    3/2010  Maloney et al.
(Continued)

OTHER PUBLICATIONS

Kiran, Mariam et al. Lambda Architecture for Cost-effective Batch and Speed Big Data processing. 2015 IEEE International Conference on Big Data, pp. 2785-2792, Oct. 29, 2015, IEEE Computer Society Washington, DC.
(Continued)

*Primary Examiner* — Hanh B Thai
(74) *Attorney, Agent, or Firm* — The Steadman Law Firm PLLC (57) ABSTRACT

An approach is described of query processing via a lambda application including a batch processing layer and a speed processing layer. The approach may improve speed and efficiency with respect to computation of query results associated with the batch processing layer. A method pertaining to such approach may include receiving a query including an initial timeframe and computing partial query results within the initial timeframe. The partial query results within the initial timeframe may include a result for data associated with the speed processing layer and results for a first set of data segments associated with the batch processing layer. The method further may include combining the partial query results within the initial timeframe into a final query result. The method further may include computing partial query results outside of the initial timeframe including results for a second set of data segments associated with the batch processing layer.

20 Claims, 6 Drawing Sheets

(51) Int. Cl.
*G06F 16/248* (2019.01)
*G06F 16/2455* (2019.01)
*G06F 16/2453* (2019.01)

(58) Field of Classification Search
USPC .......................................... 707/718, 725, 769
See application file for complete search history.

(56) References Cited

U.S. PATENT DOCUMENTS

| | | | |
|---|---|---|---|
| 9,015,108 B2 | 4/2015 | Ishimoto et al. | |
| 9,069,824 B2 | 6/2015 | Pompey et al. | |
| 9,086,695 B2 | 7/2015 | Worek et al. | |
| 9,262,476 B2 | 2/2016 | Elias et al. | |
| 9,311,139 B1 | 4/2016 | Lowery | |
| 2007/0162421 A1* | 7/2007 | Pang | G06F 16/252 |
| 2008/0098393 A1 | 4/2008 | Chai et al. | |
| 2008/0301135 A1 | 12/2008 | Alves et al. | |
| 2013/0073586 A1 | 3/2013 | Aubry et al. | |
| 2014/0156636 A1 | 6/2014 | Bellamkonda et al. | |
| 2014/0280032 A1 | 9/2014 | Komacker et al. | |
| 2015/0095308 A1 | 4/2015 | Komacker et al. | |
| 2015/0205631 A1 | 7/2015 | Lin et al. | |
| 2015/0264113 A1 | 9/2015 | Nickens et al. | |
| 2015/0296036 A1* | 10/2015 | Wang | H04L 67/10 709/203 |
| 2016/0055220 A1 | 2/2016 | Joshi et al. | |
| 2016/0267132 A1 | 9/2016 | Castellanos et al. | |
| 2016/0275411 A1* | 9/2016 | Kim | G06F 16/24568 |
| 2016/0283331 A1 | 9/2016 | Barber et al. | |
| 2016/0300157 A1 | 10/2016 | Sankaradas et al. | |
| 2017/0060622 A1* | 3/2017 | Haughwout | G06F 9/466 |
| 2017/0230451 A1* | 8/2017 | Paramasivam | G06F 16/24573 |
| 2017/0353397 A1* | 12/2017 | Che | H04L 67/10 |

OTHER PUBLICATIONS

Hasani, Zirije et al. Lambda Architecture for Real Time Big Data Analytic. ICT Innovations 2014 Web Proceedings, pp. 133-143, Oct. 9, 2014, ICT ACT.

List of IBM Patents or Patent Applications Treated as Related, Nov. 29, 2017 [2 pages].

* cited by examiner

PROCESSING A QUERY VIA A LAMBDA APPLICATION

BACKGROUND

The various embodiments described herein generally relate to query processing. More specifically, the various embodiments describe techniques of processing a query (e.g., an ad hoc query) via a lambda application.

An ad hoc query is a query that cannot be predetermined prior to issuance. Ad hoc queries involving big data systems may suffer from latencies, especially when a query request requires data processing from permanent storage such as a file system. In the context of a data system having a lambda architecture, an ad hoc query request involving historical data may require relatively slow batch processing. Since the dynamic nature of an ad hoc query does not permit pre-calculation of query results, latencies from batch processing may be common in the context of conventional query processing techniques, especially if a timeframe provided in a query request is modified repeatedly.

SUMMARY

The various embodiments described herein provide techniques of query processing via a lambda application. An associated method may include may include receiving a query (e.g., an ad hoc query) including an initial timeframe and computing partial query results within the initial timeframe. The partial query results within the initial timeframe may include a result for data associated with the speed processing layer and results for a first set of data segments associated with the batch processing layer. The method further may include combining the partial query results within the initial timeframe into a final query result. The method further may include computing partial query results outside of the initial timeframe including results for a second set of data segments associated with the batch processing layer.

In an embodiment, the method further may include receiving a modified timeframe for the query and identifying any already-computed partial query results within the modified timeframe. Responsive to identifying at least one unaddressed data segment within the modified timeframe not included in the first set of data segments or in the second set of data segments, the method further may include computing additional partial query results within the modified timeframe including results for a third set of data segments associated with the batch processing layer containing the at least one unaddressed data segment. The method further may include combining any already-computed partial query results within the modified timeframe and any additional partial query results within the modified timeframe into an updated final query result. According to such embodiment, the method further may include computing additional partial query results outside of the modified timeframe including results for a fourth set of data segments associated with the batch processing layer not included in the first set of data segments or in the second set of data segments. Furthermore, according to the above embodiments, each of the first set of data segments, the second set of data segments, the third set of data segments, and the fourth set of data segments may be a segment of data within a specified time interval.

In a further embodiment, the second set of data segments outside of the initial timeframe may include a specified quantity of data segments before the initial timeframe or a specified quantity of data segments after the initial timeframe. In an alternative embodiment, the second set of data segments outside of the initial timeframe may include a quantity of data segments before the initial timeframe or a quantity of data segments after the initial timeframe, as determined by a multiplier value. In a further embodiment, the results for the first set of data segments may be computed prior to the results for the second set of data segments.

An additional embodiment includes a computer program product including a computer readable storage medium having program instructions embodied therewith. According to such embodiment, the program instructions may be executable by a computing device to cause the computing device to perform one or more steps of above recited method. A further embodiment includes a system having a processor and a memory storing an application program, which, when executed on the processor, performs one or more steps of the above recited method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

The various embodiments described herein are directed to techniques of processing a query (e.g., an ad hoc query) via a lambda application. In the context of the various embodiments described herein, a lambda application is an application that utilizes a lambda data processing architecture such that data may be addressed via both batch processing and speed processing (i.e., stream processing or real time processing). The various embodiments are directed to techniques of computing query results for data associated with (e.g., processed and stored in) a speed processing layer of a lambda application as well as results for data segments associated with (e.g., processed and stored in) a batch processing layer of the lambda application. The techniques focus upon reducing the impact that potential timeframe modifications within a query may have upon batch processing. Specifically, the various embodiments describe computing partial query results for data segments pertaining to time intervals outside of a query timeframe in addition to partial query results for data segments pertaining to time intervals within such timeframe.

The various embodiments described herein may have advantages over conventional techniques. By computing partial query results for data segments pertaining to time intervals outside of a query timeframe as well as partial query results for data segments pertaining to time intervals within such timeframe, query results associated with the batch processing layer of a lambda application may be determined relatively quickly, with less unnecessary use of computing power and/or storage. More specifically, in the event that a query request timeframe is modified, the various embodiments may be able to facilitate use of some or all of the partial query results already computed for data segments pertaining to time intervals outside of the previous timeframe, thus eliminating the need to compute such results in response to the timeframe modification. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in the cloud, without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of this disclosure, workloads of a client computing system or server system running an application according to the various embodiments described herein may be deployed to a computing cloud. Moreover, cloud-based database systems, virtual machines, and a variety of other server applications may be used to manage such workloads.

Particular embodiments describe techniques for processing an ad hoc query via a lambda application. However, it should be understood that the techniques described herein may be adapted to a variety of purposes in addition to those specifically described herein. Accordingly, references to specific embodiments are included to be illustrative and not limiting.

Figure 1:
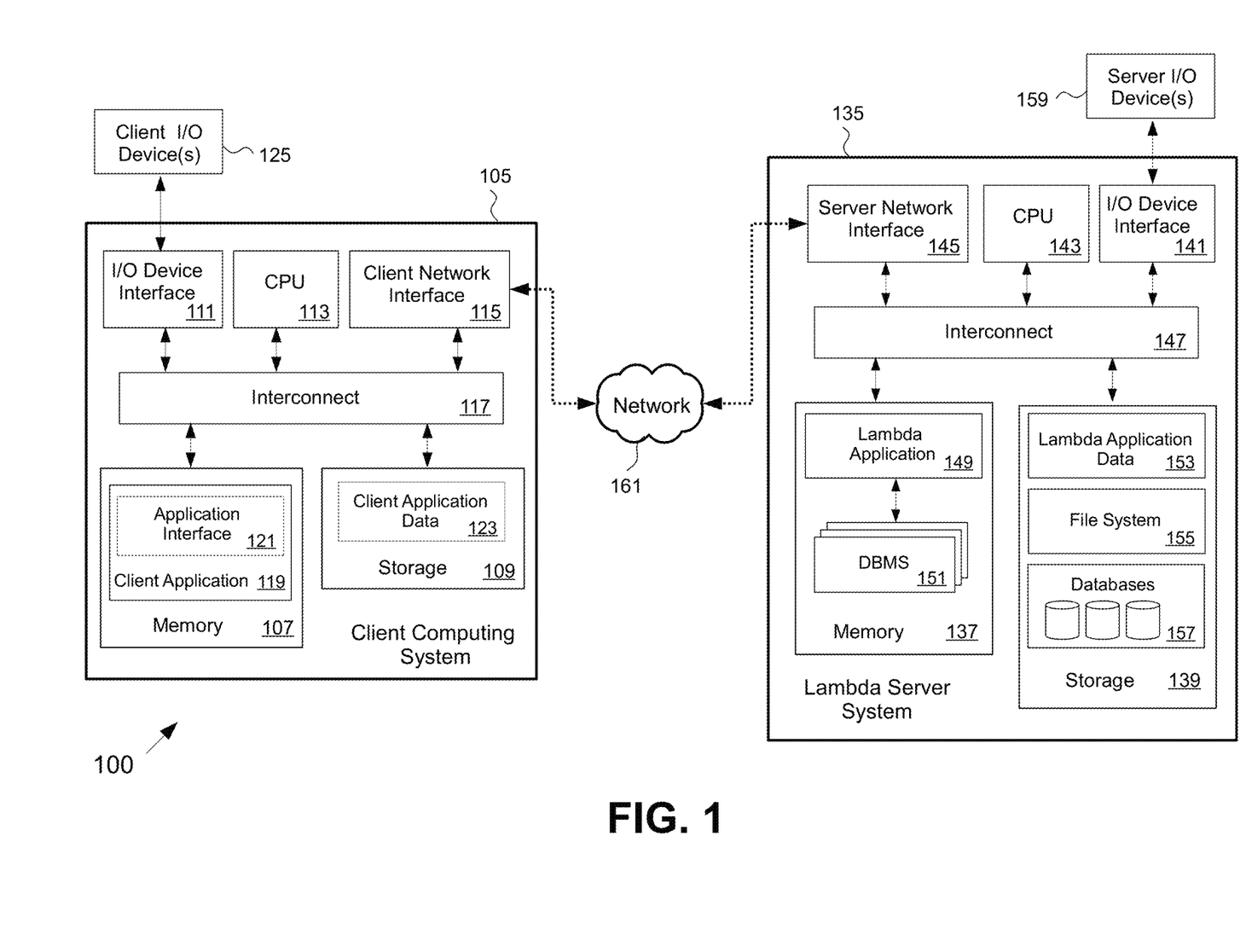
FIG. 1 illustrates a computing infrastructure, according to an embodiment.

FIG. 1 illustrates a computing infrastructure 100, according to an embodiment. As shown, computing infrastructure 100 includes a client computing system 105 and a lambda server system 135, each of which may be connected to a communications network 161.

Illustratively, client computing system 105 may include a memory 107, storage 109, client input/output (I/O) device interface 111, a central processing unit (CPU) 113, and a client network interface 115, all of which may be interconnected via interconnect 117 (e.g., a bus). Although shown as a single computing system, client computing system 105 is included to be representative of a single client or multiple clients. In an embodiment, client computing system 105 may be a thin client. Memory 107 may include a client application 119. Client application 119 may be an online or network application configured for interfacing with server system 135 and other computing systems. Client application 119 may include an application interface 121. In an embodiment, the client application interface may be a graphical user interface (GUI) with appropriate objects to designate one or more query parameters and a timeframe. According to such embodiment, the client application interface may provide text boxes, radio buttons, drop down menus, and/or similar GUI objects for the purpose of designating one or more query parameters. Further, the client application may provide a graphical timeline with a sliding feature for the purpose of designating a timeframe. Additionally or alternatively, the client application interface may provide an ability to enter one or more command lines to designate one or more query parameters and a timeframe. Storage 109 may include client application data 123 associated with client application 119. Client I/O device interface 111 may be communicatively coupled to one or more client I/O devices 125. CPU 113 is included in FIG. 1 to be representative of a single CPU, multiple CPUs, a single CPU having multiple processing cores, or the like. Client network interface 115 may receive data from, and may transmit data to, lambda server system 135 via network 161. Client computing system 105 may be configured to interface with other server systems in computing infrastructure 100.

Lambda server system 135 may include a memory 137, storage 139, a server I/O device interface 141, a CPU 143, and a server network interface 145, all of which may be interconnected via interconnect 147 (e.g., a bus). Although shown as a single computing system, lambda server system 135 is included to be representative of a single server system or multiple server systems. Although lambda server system 135 is illustrated in FIG. 1, computing infrastructure 100 may include any number of server systems. Memory 137 may include a lambda application 149 and a database management system (DBMS) 151. As further described herein, lambda application 149 may be an application for processing a query according to one or more of the various embodiments described herein. DBMS 151 is included to be representative of a single database management system or multiple database management systems. DBMS 151 may store data associated with a speed processing layer of the lambda application 149. Storage 139 may include lambda application data 153, file system 155, and databases 157. Lambda application 149 may generate and process lambda application data 153 based upon interaction with client computing system 105 and/or based upon interaction with one or more other systems via network 161. Lambda application 149 may send to DBMS 151 a database query request (e.g., a query received from client computing system 105), and DBMS 151 may process such query. DBMS 151 may include a software application configured to manage databases 157. File system 155 may be a distributed file system, e.g., Hadoop Distributed File System (HDFS). Databases 157 may include one or more ontology trees or other ontological structures. File system 155 and/or databases 157 may store data associated with a batch processing layer of the lambda application 149. While FIG. 1 illustrates three databases 157, computing infrastructure 100 may include any number of databases. According to an embodiment, DBMS 151 may send one or more requests to remote databases (not shown) via network 161.

Server I/O device interface 141 may be communicatively coupled to one or more server I/O devices 159. CPU 143 is included in FIG. 1 to be representative of a single CPU, multiple CPUs, a single CPU having multiple processing cores, or the like. Server network interface 145 may receive data from, and may transmit data to, client computing system 105 via network 161. Specifically, lambda application 149 may accept requests sent by client computing system 105 to lambda server system 135 and further may transmit data to client computing system 105 via server network interface 145.

In a further alternative embodiment, functions related to processing a query according to the various embodiments described herein may be executed externally to lambda server system 135. According to such alternative embodiment, lambda application 149 may communicate with one or more applications external to lambda server system 135 in order to obtain information or results related to query processing. Furthermore, according to such alternative embodiment, a database management system and one or more databases external to lambda server system 135 may provide to lambda application 149 or other components of lambda server system 135 information or capabilities necessary for query processing.

In a further alternative embodiment, all or some aspects of file system 155 may be stored externally to lambda server system 135. According to such alternative embodiment, lambda application 149 may communicate with one or more applications external to lambda server system 135 in order to obtain some or all information from file system 155.

Figure 2:
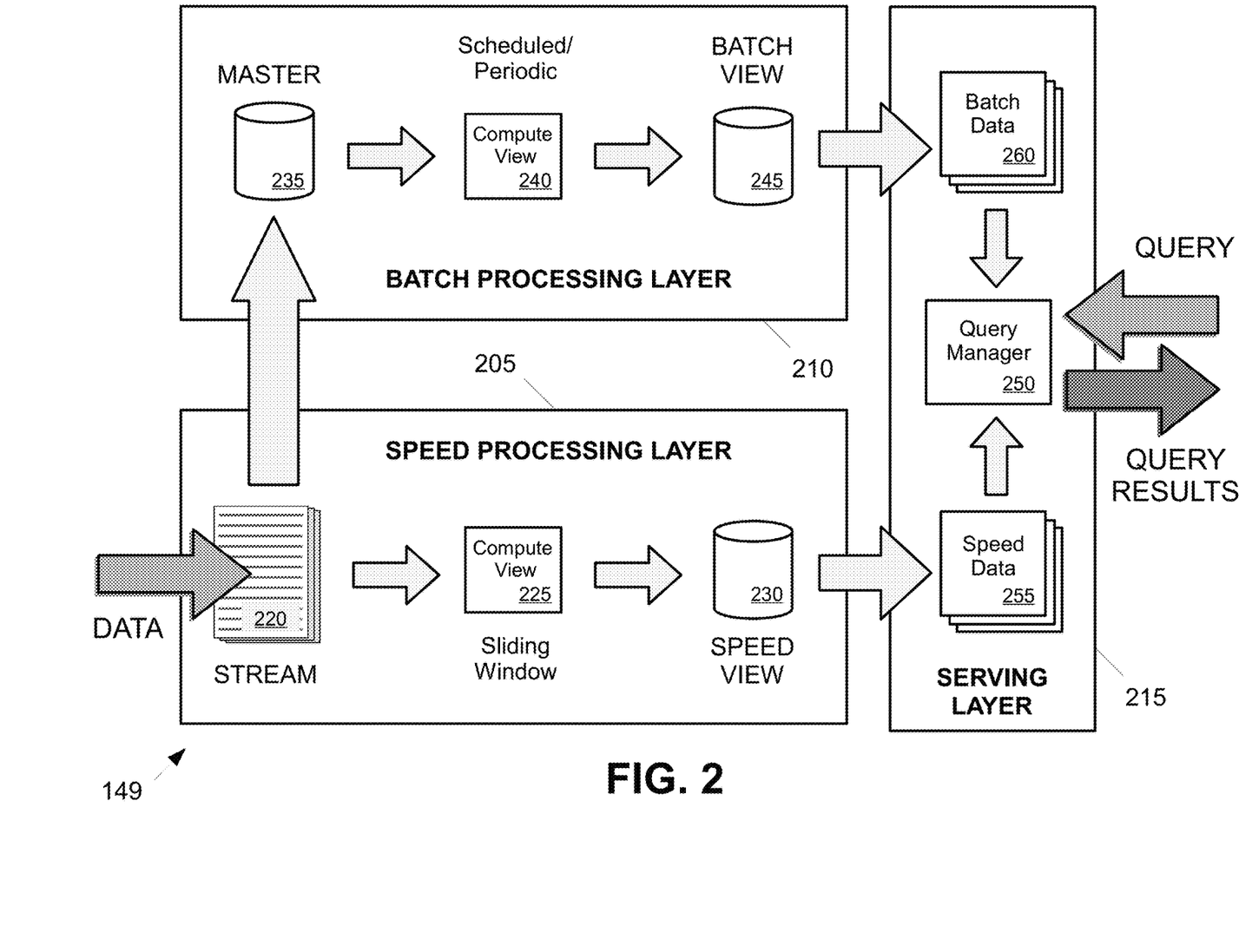
FIG. 2 illustrates a schematic view of a lambda application, according to an embodiment.

FIG. 2 illustrates a schematic view of lambda application 149, according to an embodiment. The detailed view of FIG. 2 is merely an example configuration of lambda application 149. Other configurations of lambda application 149 may be within the scope of the various embodiments described herein. As illustrated in FIG. 2, lambda application 149 may include a speed processing layer 205, a batch processing layer 210, and a serving layer 215.

Speed processing layer 205 may include a data stream 220, which may be a form of distributed queue. Data stream 220 may send data in raw format to a speed compute view manager 225. Speed view compute manager 225 may decode and extract real time data from data stream 220 and may store such real time data in speed view storage 230, which may be located in a fast-access data store in memory (e.g., DBMS 151). Speed compute view manager 225 may store the real time data indexed by time to facilitate prompt access thereto. Since only a finite amount of data can be stored in fast-access speed view storage 230 at a given time, speed view compute manager 225 may process data based on a "sliding window". As a result of the "sliding window", the data contents of speed view storage 230 are based on a certain window of present time, and such window of present time constantly moves forward as time progresses. Thus, the "sliding window" eventually moves beyond older data, at which point such older data is no longer stored in or otherwise accessible via speed view storage 230.

Since speed view storage 230 only may store a finite amount of data, batch processing layer 210 may store and process all relevant data from data stream 220. Batch processing layer 210 may include a master record 235. All data from data stream 220 may be written and archived into master record 235 in raw format. The master record 235 may be stored in a file system such as HDFS (e.g., file system 155). Batch view compute manager 240 may decode and extract batch data from the raw format data in master record 235 based upon contents of an incoming query. The data conversion may be scheduled and/or periodic in nature. Batch view compute manager 240 may store the batch data in batch view storage 245, which may be located in the file system and/or one or more databases (e.g., databases 157). In an embodiment, batch view compute manager 240 may store the batch data in the form of data segments.

In the context of the various embodiments described herein, a data segment is defined as a segment of data within a specified time interval. Each data segment may include all data, including raw data, pertaining to (i.e., recorded during) the specified time interval. A time interval specified for a data segment may be mutually exclusive with respect to respective time intervals specified for other data segments. Thus, a data segment in the context of the various embodiments is a portion of data bounded by two time periods. In an embodiment, a file name pertaining to the data segment may include such two time periods. For example, a data segment having a portion of data bounded by "time1" and "time2" may have a file name including language such as "data-segment_time1_time2". The relevant data segment bounded by "time1" and "time2" may be indexed within batch view storage 245 based upon such file name. According to a further embodiment, the granularity of such data segments may depend on the timeframe specified within an incoming query. For instance, if a query timeframe is one year, then batch view compute manager 240 may store data segments respectively representing monthly time intervals. In another example, if a query timeframe is one month, then batch view compute manager 240 may store data segments respectively representing daily time intervals. Alternatively, the granularity of such data segments may be based on one or more factors other than, or in addition to, timeframe.

Serving layer 215 may include query manager 250, speed data 255, and batch data 260. Query manager 250 may process an incoming query and may produce query results based upon one or more parameters and any timeframe provided in the query. Speed data 255 may include data from speed view storage 230 that is relevant to an incoming query, including metadata pertaining to one or more parameters of the query. Batch data 260 may include data from batch view storage 245 that is relevant to an incoming query, including metadata pertaining to one or more parameters of the query. Query manager 250 may track the constantly changing boundary between data stored in speed view storage 230 and data stored in batch view storage 245. For instance, assuming that the "sliding window" of speed processing layer 205 only permits one month of data to be stored in speed view storage 230, given a query timeframe of one year, query manager 250 may produce query results based upon speed data generated for the most recent month of the one year timeframe and batch data generated for the previous eleven months of the one year timeframe. Assuming that data in batch view storage 245 is stored in monthly data segments in the context of this example, query manager 250 may combine into a final query result a partial query result from the data in speed view storage 230 representing the most recent month of the one year timeframe and respective partial query results from eleven data segments in batch view storage 245 representing the previous eleven months of the one year timeframe. Methods for processing an incoming query with respect to data associated with speed processing layer 205 and data segments associated with batch processing layer 210 are further described herein.

Figure 3:
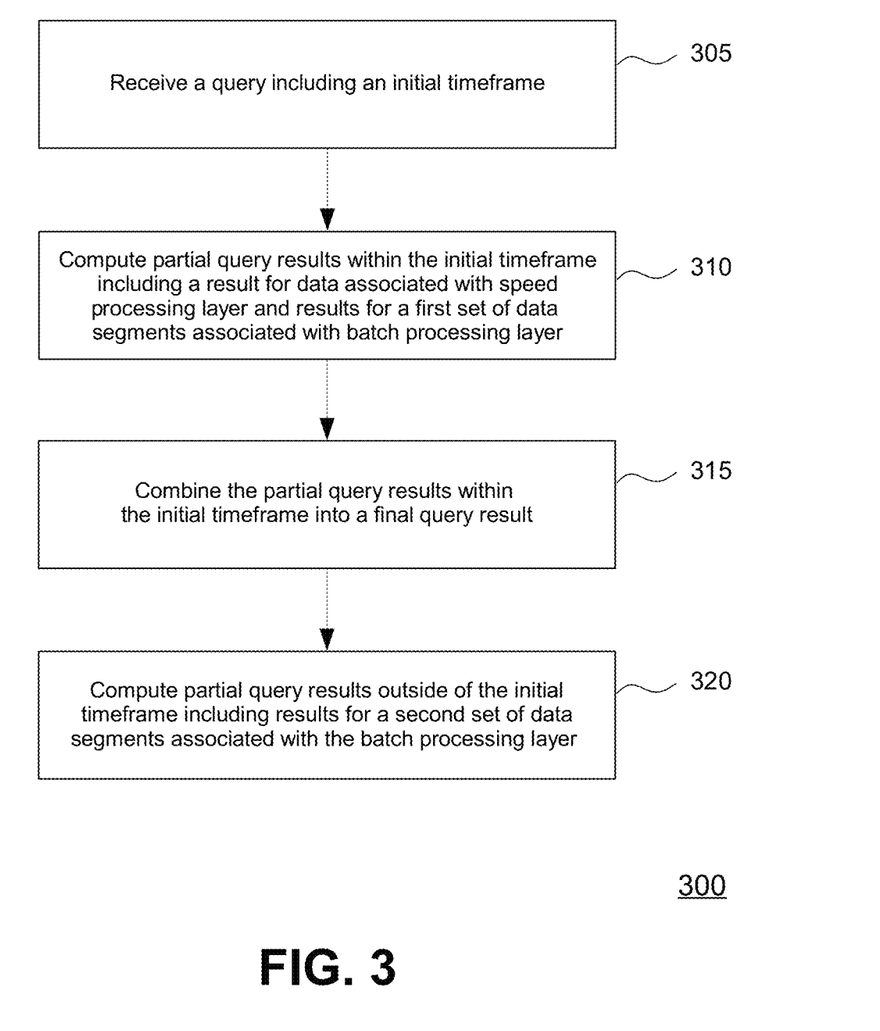
FIG. 3 illustrates a method of processing a query via a lambda application, according to an embodiment.

FIG. 3 illustrates a method 300 of processing a query (e.g., an ad hoc query), according to an embodiment. The query may be a windowed query, i.e., the query may include a timeframe bounded by two times. One or more steps associated with the method 300 may be carried out in a client-server computing environment (e.g., computing infrastructure 100). Additionally or alternatively, one or more steps associated with the method 300 may be carried out within one or more workloads of a cloud computing environment. A lambda application (e.g., lambda application 149) may facilitate processing according to the method 300 and the other methods further described herein. The lambda application may be located in a server system in the computing environment (e.g., lambda server system 135).

The method 300 may begin at step 305, where the lambda application may receive a query including an initial timeframe. For instance, the query may request a set of top trending topics on a social networking application during a given period of time. The query may be provided by a client via an interface of a client application (e.g., application interface 121 of client application 119). In the context of an embodiment involving a GUI client application interface, the client may specify the initial timeframe by adjusting a graphical timeline on the client application interface. Additionally or alternatively, the client may specify the initial timeframe via command line. The lambda application may process the query based upon one or more query parameters provided within the query and the initial timeframe.

At step 310, the lambda application may compute partial query results within the initial timeframe. The lambda application may compute the partial query results within the initial timeframe in response to receipt of the query at step 305. The lambda application may compute the partial query results within the initial timeframe via a processor of the lambda server system (e.g., CPU 143). The computed partial query results within the initial timeframe may include a result for data associated with the speed processing layer. Furthermore, the computed partial query results within the initial timeframe may include results for a first set of data segments associated with the batch processing layer.

At step 315, the lambda application may combine the partial query results within the initial timeframe into a final query result. Specifically, the final query result may include a portion of the partial query result calculated for data associated with the speed processing layer that is within the timeframe. Furthermore, the final query result may include partial query results calculated for data associated with the batch processing layer that is within the timeframe, i.e., partial query results calculated for the first set of data segments.

At step 320, the lambda application may compute partial query results outside of the initial timeframe (i.e., prior to the initial timeframe and/or after the initial timeframe). The partial query results outside of the initial timeframe may include results for a second set of data segments associated with the batch processing layer. The results computed for the second set of data segments outside of the initial timeframe may serve as a computation buffer in the event that the initial timeframe is modified. Thus, the second set of data segments may serve as a buffer set of data segments with respect to the initial timeframe. The second set of data segments may include one or more data segments. As further illustrated herein, in the event of a timeframe modification, results need not be recomputed for any data segment among the second set of data segments that is included within the modified timeframe.

The size of the second set of data segments (and thus the size of the computation buffer in the context of the initial timeframe) may be designated by one of the querying client, the lambda application, or a system administrator. According to an embodiment, the second set of data segments outside of the initial timeframe may include a specified quantity of data segments before the initial timeframe and/or may include a specified quantity of data segments after the initial timeframe. According to a further embodiment, the second set of data segments outside of the initial timeframe may include a quantity of data segments before the initial timeframe and/or a quantity of data segments after the initial timeframe, as determined by a multiplier value. Such multiplier value may be a single numerical value. For instance, assuming a value of 2 designated for the multiplier value and a timeframe 3 data segments (e.g., days) in size, the second set of data segments outside of the initial timeframe may include 6 data segments before the timeframe and/or 6 data segments after the timeframe. Alternatively, such multiplier value may specify a number of granularity levels, wherein granularity in this context refers to minutes, hours, days, weeks, months, years, etc. For instance, assuming a multiplier value of 1 granularity level and a timeframe of 1 day, the second set of data segments outside of the initial timeframe may include 1 week before the timeframe and/or 1 week after the timeframe, since a week is one granularity level broader than a day.

The partial query results computed at steps 310 and 320 may be monoidal. Thus, the partial query results may have an associative property such that once a partial query result is computed for data associated with the speed processing layer or for a given data segment associated with the batch processing layer, such partial query result may be combined with other partial query results in order to achieve a complete query result covering all data within the respective partial query results. Due to the monoidal property, the lambda application need not repeatedly compute a partial query result in order to combine or otherwise manipulate the partial query result with respect to other partial query results.

The serving layer of the lambda application (e.g., serving layer 215), or more specifically a query manager of the serving layer (e.g., query manager 250), may compute the respective partial query results at steps 310 and 320 and may combine the respective partial query results within the initial timeframe into the final query result at step 315. In an embodiment, the serving layer may compute the partial query results within the initial timeframe at step 310 and may combine the partial query results within the initial timeframe into the final query result at step 315 prior to computation of the partial query results outside of the initial timeframe at step 320. Thus, per such embodiment, the serving layer may compute the results for the first set of data segments prior to computing the results for the second set of data segments. According to an alternative embodiment, the serving layer may compute the partial query results within the initial timeframe at step 310 and may combine the partial query results within the initial timeframe into the final query result at step 315 in parallel with computation of the partial query results outside of the initial timeframe at step 320.

Thus, per such alternative embodiment, the serving layer may compute the results for the first set of data segments in parallel with computing the results for the second set of data segments. Such embodiments may minimize latency with respect to computing query results associated with the initial timeframe and returning such results to the querying client.

Figure 4:
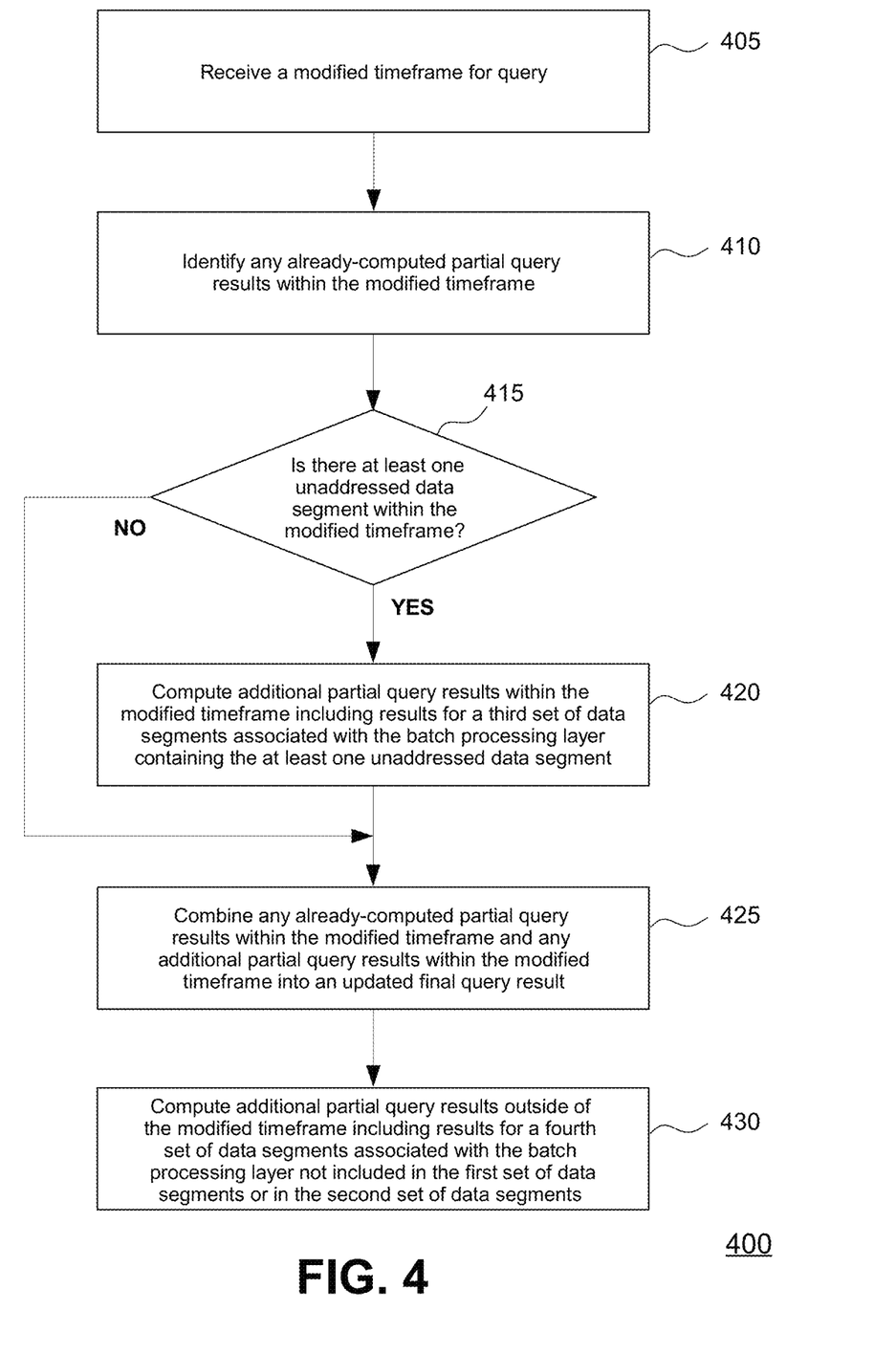
FIG. 4 illustrates a further method of processing a query via a lambda application, according to an embodiment.

FIG. 4 illustrates a further method 400 of processing a query, according to an embodiment. The method 400 may serve as an extension to the method 300. The method 400 may begin at step 405, where the lambda application may receive a modified timeframe for a query, e.g., the query processed according to the method 300. In the context of an embodiment involving a GUI client application interface, the modified timeframe may result from the client adjusting a graphical timeline on the client application interface. Additionally or alternatively, the client may modify the timeframe via command line.

At step 410, the lambda application may identify any already-computed partial query results within the modified timeframe. Such already-computed partial query results may be results previously computed at step 310 and/or step 320 of the method 300. The lambda application may identify any already-computed partial query results by determining whether the modified timeframe correlates to any data segment within the first set of data segments or the second set of data segments, for which the lambda application computed results at steps 310 and 320 respectively.

At step 415, the lambda application may determine whether at least one unaddressed data segment within the modified timeframe is not included in the first set of data segments or in the second set of data segments. Specifically, the lambda application may determine whether there is at least one unaddressed data segment associated with the batch processing layer within the modified timeframe for which partial query results have yet to be computed. Upon determining that there is no such unaddressed data segment, the lambda application may proceed directly to step 425, which is further described herein.

Responsive to identifying at least one unaddressed data segment within the modified timeframe that is not included in the first set of data segments or in the second set of data segments, at step 420 the lambda application may compute additional partial query results within the modified timeframe including results for a third set of data segments associated with the batch processing layer. The third set of data segments may contain the at least one unaddressed data segment. At step 425, the lambda application may combine any already-computed partial query results within the modified timeframe (identified at step 410) and any additional partial query results within the modified timeframe (computed at step 420) into an updated final query result.

Additionally, at step 430, the lambda application may compute additional partial query results outside of the modified timeframe (i.e., prior to the modified timeframe and/or after the modified timeframe). The additional partial query results outside of the modified timeframe may include results for a fourth set of data segments associated with the batch processing layer. The fourth set of data segments may include one or more data segments not included in the first set of data segments or in the second set of data segments. The results computed for the fourth set of data segments outside of the modified timeframe may serve as a computation buffer in the event of any further timeframe modification. Thus, the fourth set of data segments may serve as a buffer set of data segments with respect to the modified timeframe. In the event of a further timeframe modification, results need not be recomputed for any data segment among the fourth set of data segments that is included within the timeframe as further modified.

The size of the fourth set of data segments (and thus the size of the computation buffer in the context of the modified timeframe) may be designated by one of the querying client, the lambda application, or a system administrator. According to an embodiment, the fourth set of data segments outside of the modified timeframe may include a specified quantity of data segments before the modified timeframe and/or may include a specified quantity of data segments after the modified timeframe. According to a further embodiment, the fourth set of data segments outside of the modified timeframe may include a quantity of data segments before the modified timeframe and/or a quantity of data segments after the modified timeframe, as determined by a multiplier value. Such multiplier value may be a single numerical value. Alternatively, such multiplier value may specify a number of granularity levels.

The lambda application may repeat the steps of the method 400 upon receipt of any further timeframe modification. Furthermore, as with the partial query results computed in the context of the method 300, any additional partial query results computed at steps 420 and 430 may be monoidal.

The serving layer of the lambda application, or more specifically the query manager of the serving layer, may compute the respective additional partial query results at steps 420 and 430 and may combine the respective additional partial query results within the modified timeframe into the updated final query result at step 425. In an embodiment, the serving layer may compute any additional partial query results within the modified timeframe at step 420 and may combine any already-computed partial query results within the modified timeframe and any additional partial query results within the modified timeframe into the updated final query result at step 425 prior to computation of the additional partial query results outside of the modified timeframe at step 430. Thus, per such embodiment, the serving layer may compute the results for the third set of data segments prior to computing the results for the fourth set of data segments. According to an alternative embodiment, the serving layer may compute any additional partial query results within the modified timeframe at step 420 and may combine any already-computed partial query results within the modified timeframe and any additional partial query results within the modified timeframe into the updated final query result at step 425 in parallel with computation of the additional partial query results outside of the modified timeframe at step 430. Thus, per such alternative embodiment, the serving layer may compute the results for the third set of data segments in parallel with computing the results for the fourth set of data segments. Such embodiments may minimize latency with respect to computing results associated with the modified timeframe and returning such results to the querying client.

Figure 5:
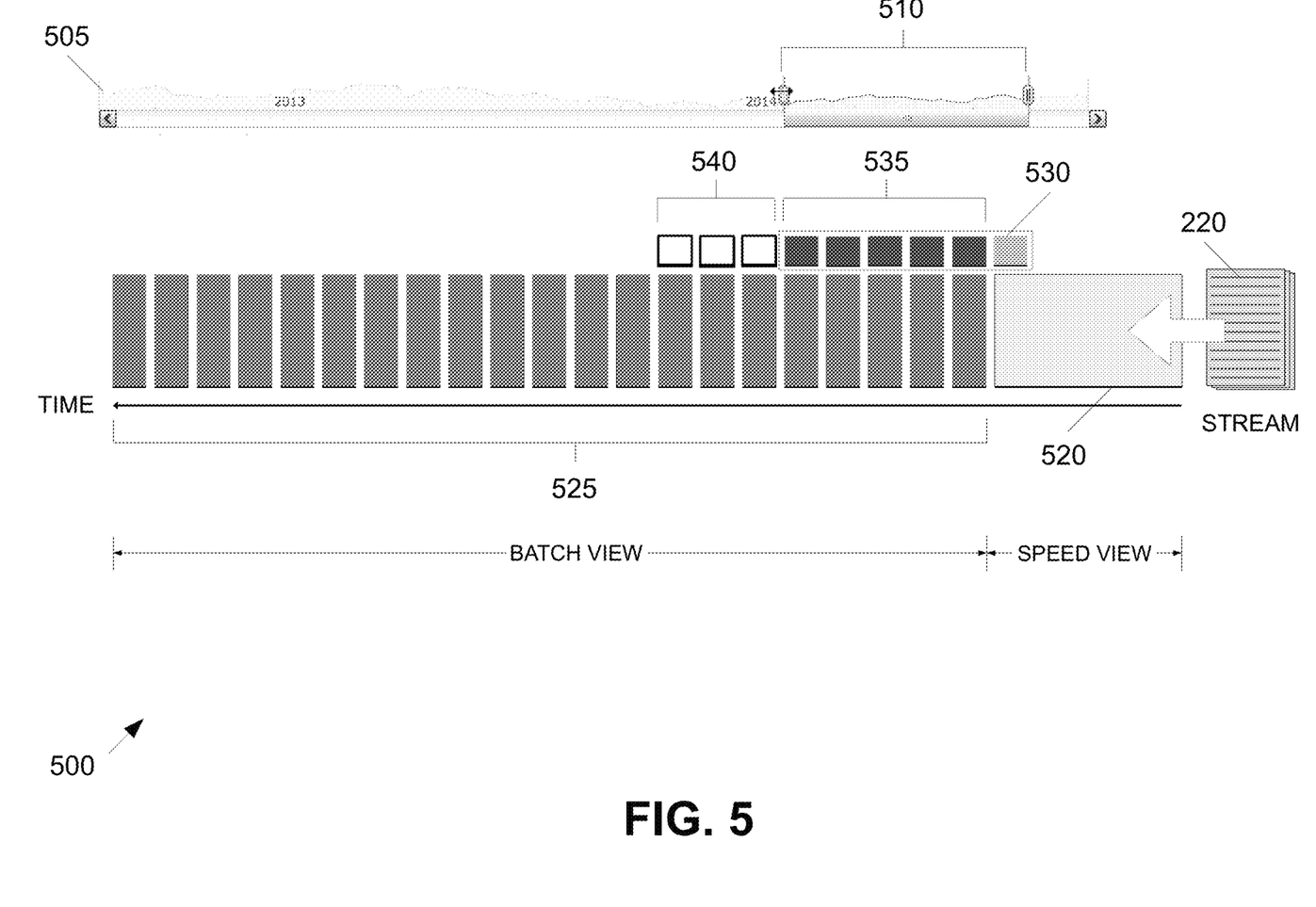
FIG. 5 illustrates a computation of query results per the method of FIG. 3 based upon an initial timeframe provided in a query, according to an example implementation.

FIG. 5 illustrates a diagram 500 depicting details with respect to computation of query results via a lambda application per the method 300 based upon an initial timeframe provided in a query. Diagram 500 illustrates an example implementation in accordance with the various embodiments described herein. Diagram 500 includes a timeline 505 for a query, including an initial timeframe 510. Initial timeframe 510 may be selected within timeline 505 by a client via a client application interface (e.g., application interface 121). Diagram 500 illustrates how the lambda application may process speed view data and batch view data from data stream 220 based upon initial timeframe 510 in order to compute query results.

As previously discussed with respect to FIG. 2, the lambda application may process data in raw format from data stream 220 in order to decode and extract data 520 associated with the speed processing layer (which, e.g., may be stored in speed view storage 230 in speed processing layer 205) and data segments 525 associated with the batch processing layer (which, e.g., may be stored in batch view storage 245 in batch processing layer 210). Diagram 500 provides a temporal perspective of the speed processing layer and the batch processing layer of the lambda application by illustrating that relatively more recent data from data stream 220 is processed from data 520 associated with the speed processing layer, while relatively less recent data from data stream 220 is processed from data segments 525 associated with the batch processing layer. Upon receiving initial timeframe 510 according to step 305 of the method 300, the lambda application may compute partial query results within initial timeframe 510 according to step 310. Specifically, the partial query results within initial timeframe 510 may include a partial query result 530 for data 520 associated with the speed processing layer. Furthermore, the partial query results within initial timeframe 510 may include partial query results 535 for a first set of data segments associated with the batch processing layer. According to step 315, the lambda application may combine into a final query result the partial query results within initial timeframe 510, i.e., partial query result 530 and partial query results 535.

Additionally, according to step 320, the lambda application may compute partial query results outside of initial timeframe 510. The partial query results outside of initial timeframe 510 may include results 540 for a second set of data segments associated with the batch processing layer. It is assumed for the context of this example that the second set of data segments is designated to include 3 data segments before initial timeframe 510. As further described herein, the results 540 computed for the second set of data segments outside of initial timeframe 510 may serve as a computation buffer in the event that initial timeframe 510 is modified.

Figure 6:
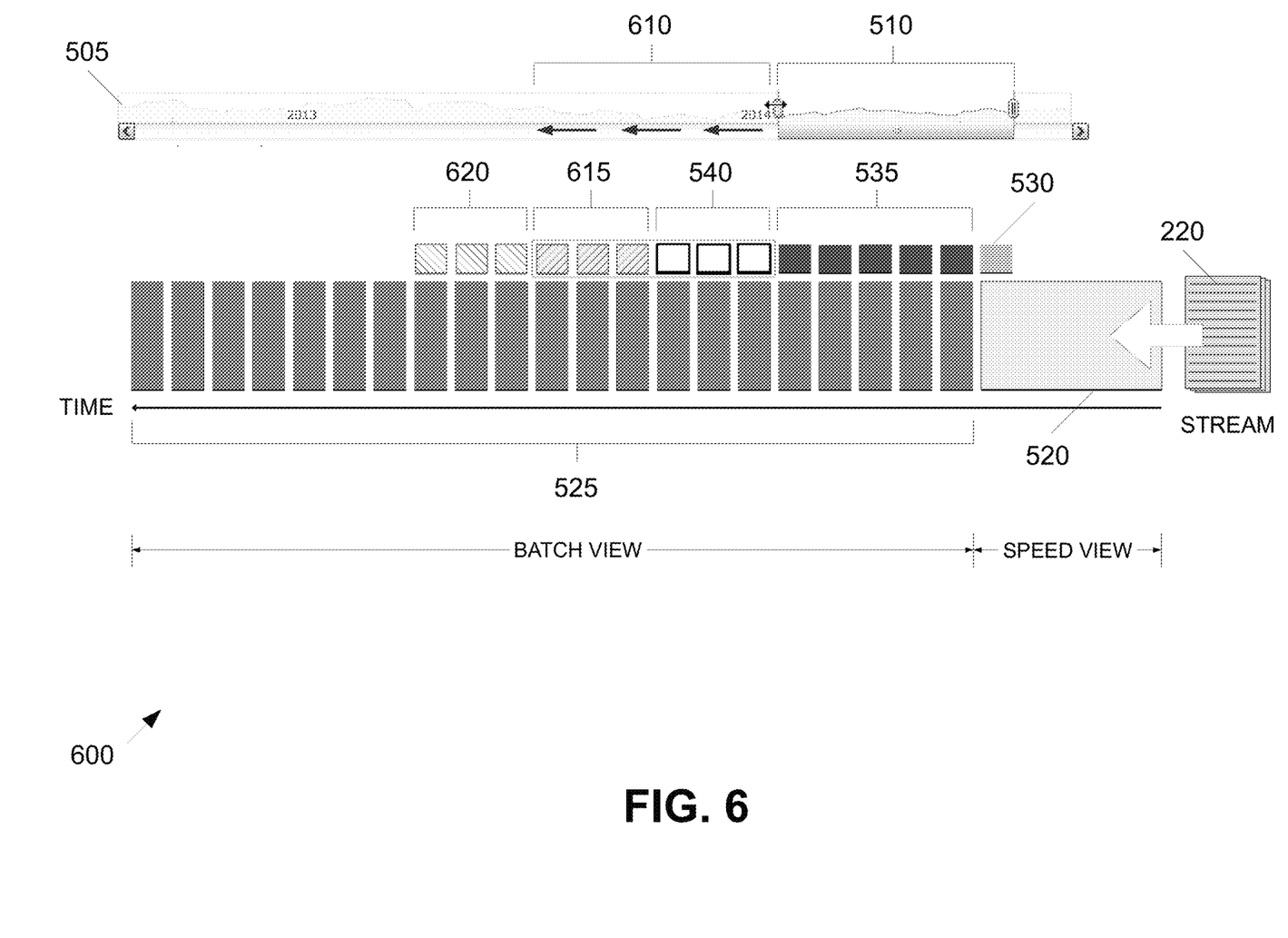
FIG. 6 illustrates a computation of query results per the method of FIG. 4 based upon a modified timeframe provided for the query referenced with respect to FIG. 5, according to an example implementation.

FIG. 6 illustrates a diagram 600 depicting details with respect to computation of query results via a lambda application per the method 400 based upon a modified timeframe provided for the query referenced with respect to diagram 500. Diagram 600 illustrates a further example implementation in accordance with the various embodiments described herein. Diagram 600 includes modified timeframe 610 provided for the query within timeline 505. Modified timeframe 610 may be selected within timeline 505 by a client via the client application interface. Diagram 600 illustrates how the lambda application may process speed view data and batch view data from data stream 220 based upon modified timeframe 610 in order to compute query results.

Upon receiving modified timeframe 610 according to step 405 of the method 400, the lambda application may identify any already-computed partial query results within modified timeframe 610 according to step 410. Specifically, the lambda application may identify partial query results 540 for the second set of data segments associated with the batch processing layer. Since results 540 were computed during processing with respect to initial timeframe 510, these results need not be recomputed. Furthermore, according to step 415, the lambda application may determine that there is at least one unaddressed data segment within modified timeframe 610 that is not included in the first set of data segments or in the second set of data segments (for which partial query results previously were computed). Specifically, the lambda application may determine that while partial query results 540 for the second set of data segments previously were addressed in the context of the method 300, there are three data segments that are unaddressed within modified timeframe 610. Thus, according to step 420 the lambda application may compute additional partial query results within modified timeframe 610 including results 615 for a third set of data segments containing the three unaddressed data segments. According to step 425, the lambda application may combine into an updated final query result the already-computed partial query results within modified timeframe 610, i.e., partial query results 540, and the additional partial query results within modified timeframe 610, i.e., partial query results 615.

Additionally, according to step 430, the lambda application may compute additional partial query results outside of modified timeframe 610. The additional partial query results outside of modified timeframe 610 may include results 620 for a fourth set of data segments that are not included in the first set of data segments or in the second set of data segments. It is assumed for the context of this example that the fourth set of data segments is designated to include 3 data segments before modified timeframe 610. The results 620 computed for the fourth set of data segments outside of modified timeframe 610 may serve as a computation buffer in the event of any further timeframe modification.

The computation buffers provided by the results computed for a second set of data segments according to step 320 of the method 300 (e.g., results 540 as illustrated in diagram 500) and the results computed for a fourth set of data segments according to step 430 of the method 400 (e.g., results 620 as illustrated in diagram 600) may enable a lambda application to spend less time computing partial query results for data segments associated with the batch processing layer in the event of one or more timeframe modifications to a query. Accordingly, a lambda application may compute query results more efficiently.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description, and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of query processing via a lambda application including a batch processing layer and a speed processing layer, the method comprising:
   receiving a query including an initial timeframe;
   computing partial query results within the initial timeframe, wherein the partial query results within the initial timeframe include a result for data associated with the speed processing layer and results for a first set of data segments associated with the batch processing layer, and wherein the data associated with the speed processing layer is processed with respect to speed view storage based on a window of present time that moves forward as time progresses such that older data beyond which the window moves is no longer stored in or otherwise accessible via the speed view storage;

combining the partial query results within the initial timeframe into a final query result; and computing partial query results outside of the initial timeframe including results for a second set of data segments associated with the batch processing layer.

2. The method of claim 1, further comprising:

receiving a modified timeframe for the query;

identifying any already-computed partial query results within the modified timeframe;

responsive to identifying at least one unaddressed data segment within the modified timeframe not included in the first set of data segments or in the second set of data segments, computing additional partial query results within the modified timeframe including results for a third set of data segments associated with the batch processing layer containing the at least one unaddressed data segment; and combining any already-computed partial query results within the modified timeframe and any additional partial query results within the modified timeframe into an updated final query result.

3. The method of claim 2, further comprising computing additional partial query results outside of the modified timeframe including results for a fourth set of data segments associated with the batch processing layer not included in the first set of data segments or in the second set of data segments.

4. The method of claim 3, wherein each of the first set of data segments, the second set of data segments, the third set of data segments, and the fourth set of data segments is a segment of data within a specified time interval.

5. The method of claim 1, wherein the second set of data segments outside of the initial timeframe includes a specified quantity of data segments before the initial timeframe or a specified quantity of data segments after the initial timeframe.

6. The method of claim 1, wherein the second set of data segments outside of the initial timeframe includes a quantity of data segments before the initial timeframe or a quantity of data segments after the initial timeframe, as determined by a multiplier value.

7. The method of claim 1, wherein the results for the first set of data segments are computed prior to the results for the second set of data segments.

8. A computer program product comprising a computer readable storage medium having program instructions embodied therewith for query processing via a lambda application including a batch processing layer and a speed processing layer, the program instructions executable by a computing device to cause the computing device to:

receive a query including an initial timeframe;

compute partial query results within the initial timeframe, wherein the partial query results within the initial timeframe include a result for data associated with the speed processing layer and results for a first set of data segments associated with the batch processing layer, and wherein the data associated with the speed processing layer is processed with respect to speed view storage based on a window of present time that moves forward as time progresses such that older data beyond which the window moves is no longer stored in or otherwise accessible via the speed view storage;

combine the partial query results within the initial timeframe into a final query result; and compute partial query results outside of the initial timeframe including results for a second set of data segments associated with the batch processing layer.

9. The computer program product of claim 8, wherein the program instructions further cause the computing device to:

receive a modified timeframe for the query;

identify any already-computed partial query results within the modified timeframe;

responsive to identifying at least one unaddressed data segment within the modified timeframe not included in the first set of data segments or in the second set of data segments, compute additional partial query results within the modified timeframe including results for a third set of data segments associated with the batch processing layer containing the at least one unaddressed data segment; and combine any already-computed partial query results within the modified timeframe and any additional partial query results within the modified timeframe into an updated final query result.

10. The computer program product of claim 9, wherein the program instructions further cause the computing device to compute additional partial query results outside of the modified timeframe including results for a fourth set of data segments associated with the batch processing layer not included in the first set of data segments or in the second set of data segments.

11. The computer program product of claim 10, wherein each of the first set of data segments, the second set of data segments, the third set of data segments, and the fourth set of data segments is a segment of data within a specified time interval.

12. The computer program product of claim 8, wherein the second set of data segments outside of the initial timeframe includes a specified quantity of data segments before the initial timeframe or a specified quantity of data segments after the initial timeframe.

13. The computer program product of claim 8, wherein the second set of data segments outside of the initial timeframe includes a quantity of data segments before the initial timeframe or a quantity of data segments after the initial timeframe, as determined by a multiplier value.

14. The computer program product of claim 8, wherein the results for the first set of data segments are computed prior to the results for the second set of data segments.

15. A system comprising:

a processor; and a memory storing an application program, which, when executed on the processor, performs an operation of query processing via a lambda application including a batch processing layer and a speed processing layer, the operation comprising:

receiving a query including an initial timeframe;

computing partial query results within the initial timeframe, wherein the partial query results within the initial timeframe include a result for data associated with the speed processing layer and results for a first set of data segments associated with the batch processing layer, and wherein the data associated with the speed processing layer is processed with respect to speed view storage based on a window of present time that moves forward as time progresses such that older data beyond which the window moves is no longer stored in or otherwise accessible via the speed view storage;

combining the partial query results within the initial timeframe into a final query result; and computing partial query results outside of the initial timeframe including results for a second set of data segments associated with the batch processing layer.

16. The system of claim 15, wherein the operation further comprises:

receiving a modified timeframe for the query;

identifying any already-computed partial query results within the modified timeframe;

responsive to identifying at least one unaddressed data segment within the modified timeframe not included in the first set of data segments or in the second set of data segments, computing additional partial query results within the modified timeframe including results for a third set of data segments associated with the batch processing layer containing the at least one unaddressed data segment; and combining any already-computed partial query results within the modified timeframe and any additional partial query results within the modified timeframe into an updated final query result.

17. The system of claim 16, wherein the operation further comprises computing additional partial query results outside of the modified timeframe including results for a fourth set of data segments associated with the batch processing layer not included in the first set of data segments or in the second set of data segments.

18. The system of claim 17, wherein each of the first set of data segments, the second set of data segments, the third set of data segments, and the fourth set of data segments is a segment of data within a specified time interval.

19. The system of claim 15, wherein the second set of data segments outside of the initial timeframe includes a specified quantity of data segments before the initial timeframe or a specified quantity of data segments after the initial timeframe.

20. The system of claim 15, wherein the second set of data segments outside of the initial timeframe includes a quantity of data segments before the initial timeframe or a quantity of data segments after the initial timeframe, as determined by a multiplier value.

\* \* \* \* \*